US005297252A

United States Patent [19]

Becker

[11] Patent Number: 5,297,252

[45] Date of Patent: Mar. 22, 1994

[54] COLOR GRAPHICS TERMINAL FOR MONITORING AN ALARM SYSTEM

[76] Inventor: Don Becker, 57 Brook Street East, Tara, Ontario, Canada, N0H 2N0

[21] Appl. No.: 696,494

[22] Filed: May 7, 1991

[51] Int. Cl.[5] .............. G06F 15/00

[52] U.S. Cl. .............. 395/160; 395/161; 340/506; 340/505; 364/188; 364/138

[58] Field of Search .............. 395/157, 160, 161; 364/138, 146, 188, 423; 340/506, 525

[56] References Cited

U.S. PATENT DOCUMENTS

| | | | |
|---|---|---|---|
| 4,812,819 | 3/1989 | Corsberg | 340/525 X |
| 4,962,473 | 10/1990 | Craw | 364/423 |
| 5,061,916 | 10/1991 | French et al. | 340/525 X |
| 5,086,385 | 2/1992 | Launey et al. | 364/188 |

OTHER PUBLICATIONS

Microsoft Windows User's Guide, Version 3.0, 1990, pp. 33–41.

*Primary Examiner*—Mark K. Zimmerman

[57] ABSTRACT

A color graphics terminal for monitoring a system in which a graphics monitor is connected to a computer, the graphics and at least two separate graphics windows which are capable of representing simultaneously two geographically, hierarchically related graphic displays of the system, with an arrangement for controlling the computer to automatically display on the graphics monitor the related graphic displays in response to certain inputs received by the computer.

15 Claims, 8 Drawing Sheets

COLOR GRAPHICS TERMINAL FOR MONITORING AN ALARM SYSTEM

The present invention relates to a novel multi-graphic display and touch screen terminal capable of monitoring the events of a system, e.g., a fire alarm system. Alarm, trouble, supervisory, and monitor inputs are instantly and simultaneously depicted on floor plans, building profiles, facility overviews, and zone plans to accurately identify their source and location. This novel color graphics terminal also allows authorized operators to manipulate certain aspects of the fire alarm system directly from the touch screen, i.e., they can move the graphic displays from one window to another and call up other graphic displays to specific windows; acknowledge status changes, such as alarm or supervisory inputs; print hard-copy reports; and activate or deactivate individual system devices or circuits, such as smoke detectors, manual stations, doors, fans, sprinklers, and individual circuits.

BACKGROUND OF THE INVENTION

Recent advancements in alarm system technology involve the integration of remote alarm devices and computer systems. The computers typically allow the operator to view a diagram of the specific floor plan from which the alarm source is derived, and control certain functions of the system directly from a computer keyboard or mouse.

Although use of computers has greatly enhanced the control over the entire alarm system, there remains a desire to make these systems more user friendly. That is, firemen entering a burning building under an emergency situation find it extremely difficult to sit down at a computer keyboard to issue commands to, or decipher information provided from, the computer. This problem has prompted the alarm system industry to undertake the development of systems which are easier to use and operate.

In one user friendly system that has been developed, a single graphics window and touch screen capability are provided, thereby overcoming the disadvantages of manual computer systems, i.e., keyboard commands and cumbersome key stroke combinations.

Still, under emergency situations it is very difficult for a fireman or other system operator to know exactly where the alarm source is coming when confronted with a single graphic display system. That is, a fireman unfamiliar with the premises will be confronted with a graphic display that only shows the floor plan of the specific floor from which the alarm source is emanating. The fireman will have no other reference to aid in his or her understanding of the location or relationship of this floor plan to the building or facility. This is a particular problem in a building having multiple wings or facilities having multiple buildings, such as a university campus.

Another problem arises when there are multiple fires on different floors or in a different building. A single graphic display system only permits viewing of the alarm situation on one floor, and thus the operator has no idea that there are fires on other floors or in other parts of the facility. Having such information would certainly aid in the strategy for extinguishing the fires.

The present invention overcomes the aforementioned disadvantages relating to both keyboard systems and single graphic display, touch screen systems. It is an object of the present invention to provide easy-to-read multi-graphic displays, preferably with a touch screen that eliminates keyboard inputs, complex codes, and single graphic displays.

The multiple graphics windows of the present invention having at-a-glance portrayal of events and their relationship to the overall building or facility, coupled with the graphic terminal's touch screen operation, makes it invaluable in emergency situations when seconds count. That is, a fireman simultaneously views the detail area of the fire, as well as broader peripheral views of where the fire's location is relative to the building and/or campus. Also, the fireman receives visual information as to what other areas of the building or campus may be involved in the fire. All this information is provided to the fireman as he or she approaches the graphics monitor without the need to interact with the computer or issue any commands.

A further object of the present invention is to keep tabs on a wide range of system events, whereby alarm, trouble, supervisory, and monitor inputs are instantly color-coded and depicted on floor plans that pinpoint their source. Additionally, authorized operators can manipulate certain aspects of the fire alarm system, i.e., they can acknowledge status changes, such as alarm or supervisory inputs, print hard copy reports, and activate or deactivate individual devices and circuit, such as smoke detectors, manual stations, doors, fans, sprinklers, and individual circuits.

The present invention also provides many additional advantages which shall become apparent as described below.

SUMMARY OF THE INVENTION

A color graphics terminal for monitoring a system comprising: a computer means; a graphics monitor connected to the computer means, the graphics monitor having at least two separate graphics windows and capable of presenting simultaneously two related graphic displays of the system; and a means for controlling the computer means to automatically present on the graphics monitor related graphic displays in response to certain inputs received by the computer means. The inputs received by the computer means may, for example, relate to the occurrence of certain events taking place within the system; whereby at least a peripheral perception of the events is displayed in the graphics windows. Additional inputs may be received due to operator contact with the graphics monitor.

The color graphics terminal typically includes a touch screen which is capable of moving the related graphic displays from one graphics window to another, calling-up other graphic displays of the system to any of the graphics windows, and activating switches on a common control panel.

In a principal embodiment, the graphics monitor comprises at least a main graphics window and a secondary graphics window. More preferably, the graphics monitor comprises three graphics windows, e.g., a main graphics window and two secondary graphics windows. The related graphic displays shown in the three graphics windows have the following hierarchical relationship: zone plans, floor plans, building profile, facility overview, common control panel, and cover screen. The graphics monitor also may include a command menu window, at least one message window, a system status window, a system title window and a time/date window.

The means for interacting with the graphic displays is preferably either a touch screen, a computer keyboard or a computer mouse.

The preferred color graphics terminal includes a touch screen disposed about the graphics monitor in such a manner that when a given area of the touch screen is touched the related graphic displays will be affected. For example, touching icons in the main graphics window will enable or disable system devices or circuits corresponding to the respective icons or acknowledge input from these system devices or circuits. Moreover, touching touch points of the secondary graphics window immediately moves the graphic displayed in the secondary graphics window into the main graphics window. The icons in the graphic displays are inoperable while the graphic displays are in the secondary graphics window.

Also, touching touch-points in the main graphics window will select floor plans or activate switches on a common control panel. Touching any part of a zone within a floor plan graphically displayed in the main graphics window immediately moves the respective zone plan into the main graphics window and the floor plan to the secondary graphics window.

The color graphics terminal of the present invention is preferably used with a fire alarm system for monitoring alarm and trouble events and the like. The system devices or circuits which may be enabled or disabled by touching icons when the color graphics terminal is connected to a fire alarm system are, for example, smoke detectors, manual stations, doors, fans, sprinklers, and individual circuits.

Other and further objects, advantages and features of the present invention will be understood by reference to the following specification in conjunction with the annexed drawings, wherein like parts have been given like numbers.

BRIEF DESCRIPTION OF THE DRAWING

FIG. 8 is a more detailed, exemplary, interactive flowchart depicting the decisions and actions that may be taken when an input signal is detected by the computer of the color graphics terminal according to the present invention; in particular.

DESCRIPTION OF THE PREFERRED EMBODIMENTS

The color graphics terminal of the present invention represents the combination of the latest computer technology with the best in fire alarm systems. The result is an elegant and deceptively simple system monitoring and response tool. It features easy-to-read graphic displays and a touch-sensitive screen that eliminates keyboard input and complex codes. This terminal simultaneously provides, at the user's selection, peripheral related graphic displays, such as building profile, floor plans, and zone plans of the building being monitored. Alarm, trouble, supervisory, and monitor inputs are instantly color-coded and depicted simultaneously on floor plans, building profiles, zone plans, and facility overviews that pinpoint their source.

In addition to reviewing system events, authorized operators can manipulate certain aspects of the system. They can, for example, acknowledge status changes such as alarm or supervisory inputs, print hard-copy reports, and even activate or deactivate individual devices.

Figure 1:
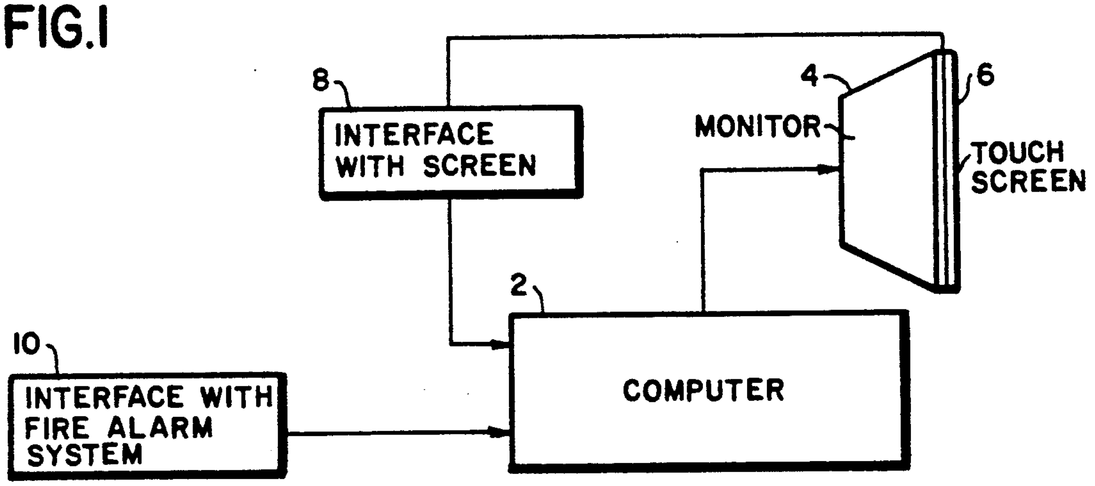
FIG. 1 is a schematic representation of the color graphics terminal according to the present invention.

The color graphics terminal according to the present invention can best be described by referring to the drawings, wherein FIG. 1 is schematic representation of a color graphics terminal for monitoring a system comprising: a computer means 2; a graphics monitor 4 connected to computer means 2; and touch screen 6. Touch screen 6 and the alarm system (not shown) are connected to computer means 2 via interfaces 8 and 10, respectively.

Computer means 2 is preferably an IBM PC/AT compatible computer having at least a 12 MHz system clock and a 20 megabyte hard drive, e.g., an Epson Equity 386sx with a clock speed of 16 MHz and 1 MB RAM. The computer should have a 3.5 inch floppy disk drive with a capacity greater than or equal to 750 KB. Monitor 6 is typically a 14 inch EGA or VGA compatible graphics controller having greater than or equal to 640 W×350H pixels resolution and greater than or equal to sixteen simultaneous colors, e.g., a NEC Multisync 2A. Interface 8 should preferably be a 16 bit AT bus compatible interface. Touch screen 6 is preferably an Elographics Accutouch touch screen. The software is typically MS-DOS version 3.2 from Microsoft Inc., HALO 88 Graphics Library from Media Cybernetics Inc., and, optionally, DR HALO III Graphics Editor from International Microcomputer Software Inc.

The color graphics terminal is typically connected to a fire alarm system, such as that disclosed in co-pending U.S. patent application, Ser. No. 609,173 (Ferguson et al.), filed May 11, 1984, and entitled "Fire Alarm Control and Emergency Communication System". This application is incorporated herein by reference.

Figure 7:
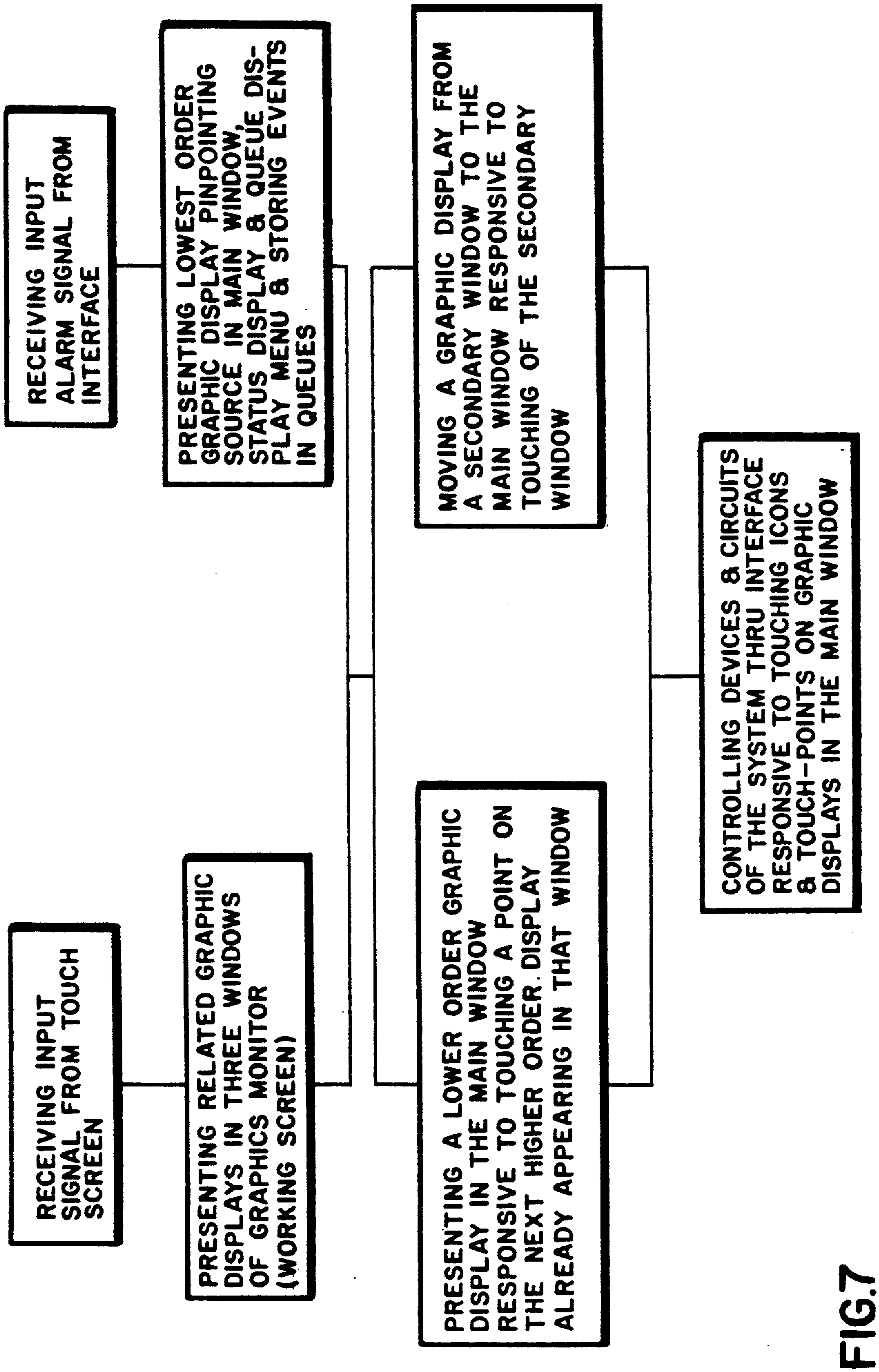
FIG. 7 is an overview flowchart depicting the basic computer operations taking place in the color graphics terminal of the present invention when an input signal is received from either the touch screen or alarm interface.

The basic functions or operations of the color graphics terminal of the present invention are outlined in the overview flowchart set forth in FIG. 7. The color graphics terminal receives an input signal from either the touch screen or alarm/trouble signal from their respective system interfaces. If the input is a signal from the touch screen, then the cover screen on the graphics monitor is replaced with a Working Screen depicting related graphic displays in three graphics windows. If the input is a signal from the alarm/trouble devices or circuits, then the cover screen on the graphics monitor is replaced with a Working Screen wherein the lowest order graphics display capable of pinpointing the source is displayed in the main graphics window, related views are displayed in the secondary graphics windows, the status display flashes the event, and the event is stored in the respective queue. Thereafter, the operator may either (1) present a lower order graphic display in the main graphics window by touching any part on the graphic display of the next higher order already appearing in the main graphics window, or (2) move a graphic display from a secondary window to the main graphics window by touching any part of the respective secondary graphics windows. The devices and circuits of the alarm system may thereafter be controlled by touching either an icon or a touch-point activated on the graphics display in the main graphics window.

Figure 2:
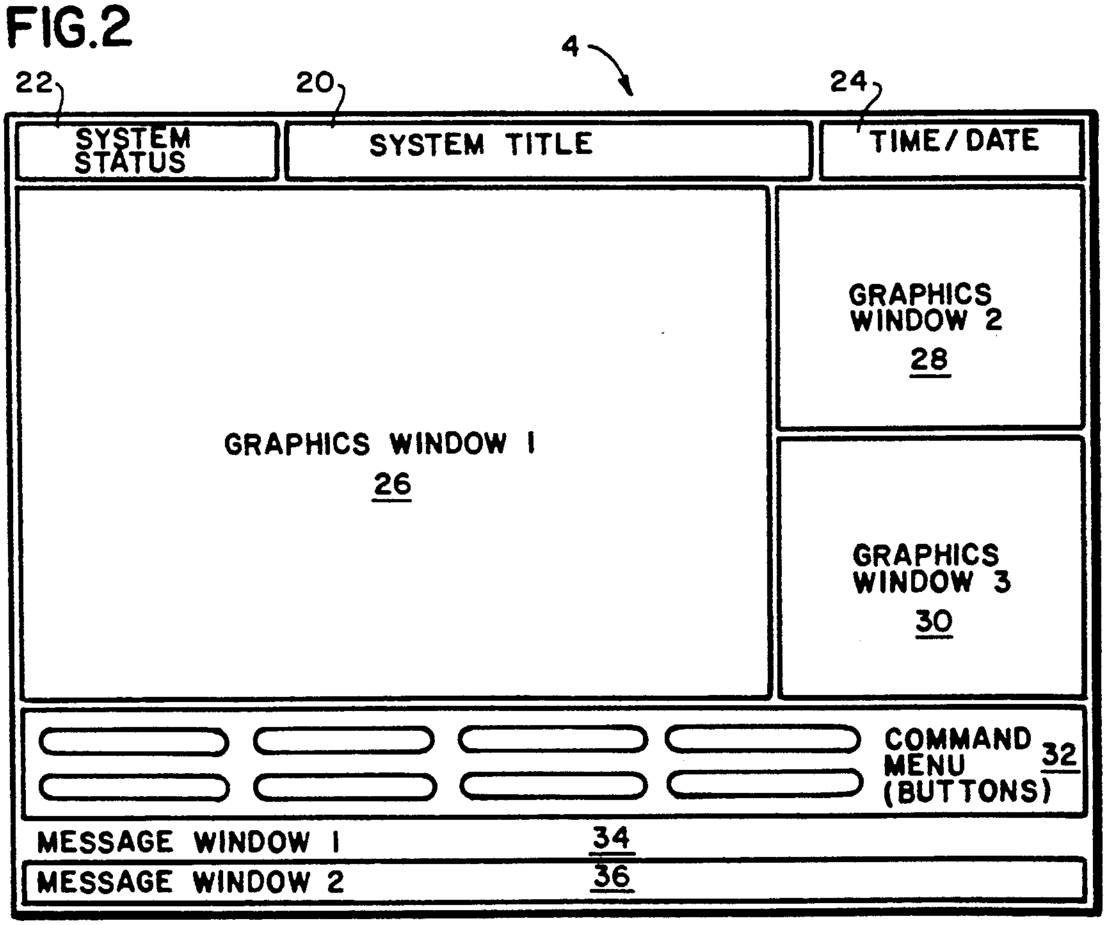
FIG. 2 is a schematic representation of the complete set of windows on the screen of the graphics monitor according to the present invention.

As depicted in FIG. 2, graphics monitor 4 has multiple graphics windows capable of presenting simultaneously two related graphic displays of the system. FIG. 2 is a schematic representation of a typical "Working Screen". This Working Screen is central to the color graphics terminal of the present invention. It is preferably divided into nine constant (i.e., immovable) fields. The nine fields are system title window 20, system status window 22, time/date window 24, main graphics window 26, secondary graphics window 28, secondary graphics window 30, command menu window 32, message window 34, and message window 36.

System title window 20 is simply a field provided to display the name of the building or location. The contents of this window are programmed when the system is installed and do not change.

System status window 22 displays the current system status of highest priority. If the system is in standby mode, the message simply says "SYSTEM IN STANDBY". If it then goes into trouble mode, "SYSTEM IN TROUBLE" is displayed. An alarm input at this point will result in "SYSTEM IN ALARM" appearing in the system status window 22 and there it will remain until the alarms are cleared and the system is reset. Background colors of this field are also associated with each system status, i.e., red for alarm, yellow for trouble, and green for standby.

Time/date window 24 displays the current system time and date, updated continually.

Main graphics window 26 is an interactive field that holds a selected graphic display. Building profiles, floor plans, zone plans, facility overviews, and common controls are typical contents of this field. Each of these graphic displays contain one or more touch-points that can be used to manipulate system controls.

Secondary graphics windows 28 and 30 offer limited interaction. They hold graphic displays in waiting—reduced versions of floor plans, zone plans, building profiles, facility overviews, or control panels—that are selected by touching them anywhere within their borders. The contents of secondary graphics windows 28 and 30 change depending on the graphic displayed in main graphics window 26. If, for example, a zone plan is in main graphics window 26, then a building profile will be displayed in secondary graphics window 28, and a floor plan showing the whole floor from which the zone plan is excerpted will be displayed in secondary window 30. For secondary graphics windows 28 and 30, the entire field is one active touch area. No touch-points within them can be selected until the whole graphic display is enlarged and pulled into main graphics window 26 by selecting it.

Command menu window 32 is a screen area that contains all the control buttons that are active at any given time. Control buttons, which are individual touch-sensitive fields, are used to operate the graphics terminal's options. These options include the display of specific graphic displays, activation or deactivation of individual fire alarm devices, printing of reports, etc.

Message windows 34 and 36 display single lines of text. Generally speaking, message window 34 displays system responses to operator input, while message window 36 displays system prompts for operator input.

The color graphics terminal operates as follows. Each screen or page of graphics monitor 4 includes pre-programmed areas that, when touched, execute specific commands. These areas vary in size and shape according to the graphic composition of the current screen. For example, a row of buttons depicted in command menu window 32 will actually be fully functional as buttons. Each time an active area is touched, an audible beep is generated by the color graphics terminal to confirm the selection.

The color graphics terminal uses touch-sensitive areas in three different ways, i.e., to operate buttons; to select touch-points and icons; and to change the main graphics window. Buttons are used to execute specific commands. They acknowledge alarms, sign on operators, or call up on-line help. Purely functional, buttons are simply button-shaped, and always appear in command menu window 32 near the bottom of the screen.

Touch-points and icons, on the other hand, appear exclusively within the graphic displays disposed within main graphics window 26 and secondary graphics windows 28 and 30. Touch-points are used to select floor or levels on a building profile, or to activate switches on a common control panel. Icons are the same as touch-points, but represent fire alarm devices or circuits; they are appearance- and position-significant.

This means that an icon representing a manual station, for example, will have a distinct appearance and its position in the graphic display will represent the location of the actual device. Icons are used to enable or disable smoke detectors, manual stations, doors, fans, sprinklers, and individual circuits, or to acknowledge input from these devices or circuits.

The graphics monitor 4 uses touch-sensitive areas on touch screen 6 to change the graphic displayed in main graphics window 26. Touching any part of either of the two secondary graphics windows immediately moves the graphic display from the selected secondary graphics window into the main graphics window. Once there, the icons and touch-points within the graphics display can be manipulated or operated.

There are two ways of interacting with the color graphics terminal through its graphics windows and its command menu window. Interaction through the graphics windows involves the manipulation and selection of graphic displays, icons, and touch-points. Commands, on the other hand, involve only buttons. These buttons always appear in the command area just below the graphics windows.

Command buttons are arranged in groups called menus. One menu is displayed at a time. To execute a command one simply touches the designated button. Only active buttons appear in command menu window 32. This means that if the user is not authorized to execute the command, or if the command is not possible at that stage of interaction, the button simply will not appear. Command menus are arranged in a chain, i.e., a command in one menu will bring up another menu and so on.

Figure 5:
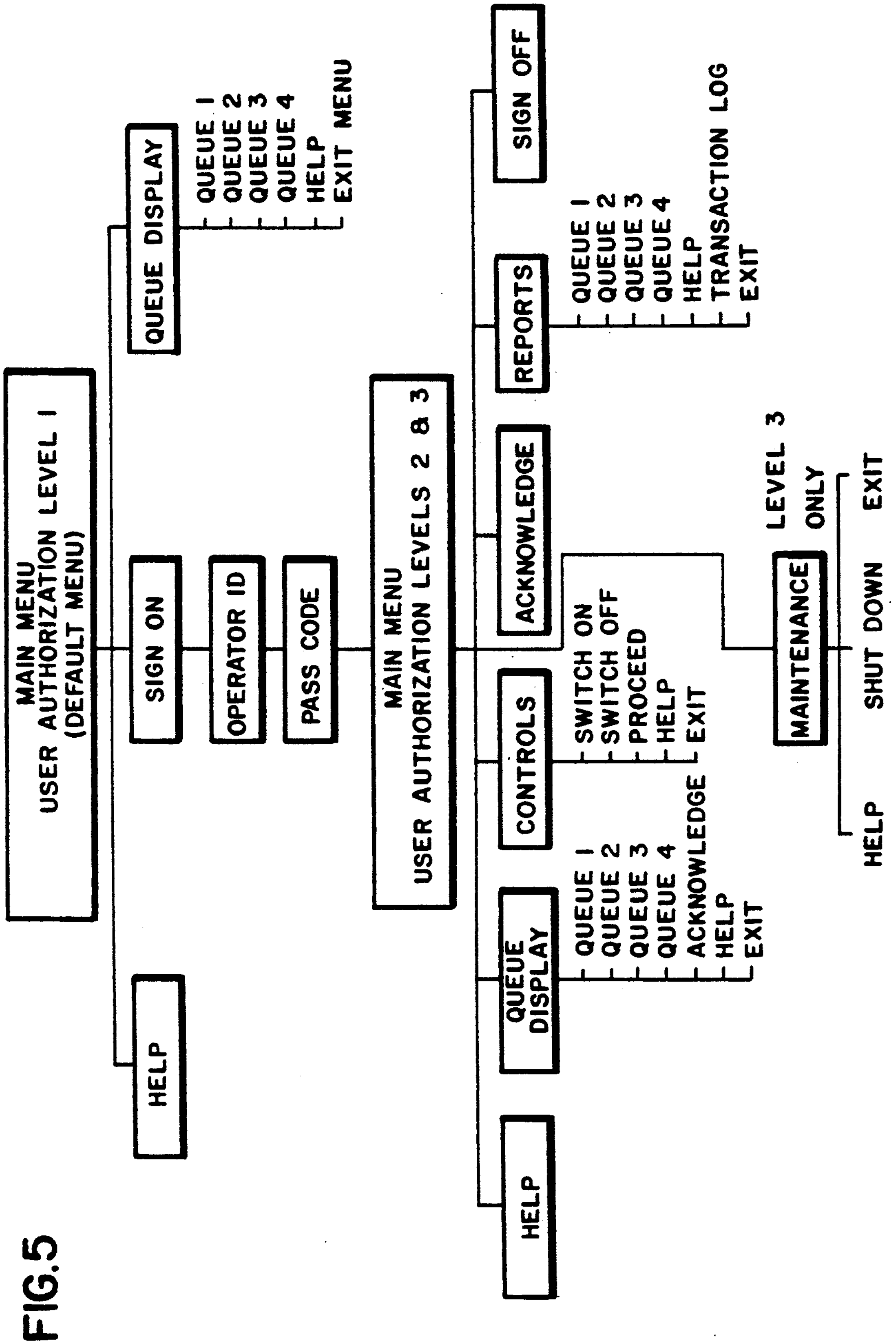
FIG. 5 is a flowchart demonstrating the levels of user authorizations.

As clearly shown in FIG. 5, the color graphics terminal authorizes three levels of user interaction. Level 1 is the default authorization, i.e., no sign-on is required. Within this level of authorization, the user can move among graphic displays and view system events (i.e., alarms, troubles, etc). From Level 1 the operator can also invoke help and sign-on to higher authorization levels. No other activities are possible.

Authorization Levels 2 and 3 enjoy the same privileges offered to Level 1, but in addition, users at these higher levels can control and interact with the color graphics terminal. Specifically, Levels 2 and 3 users can acknowledge events, activate and deactivate devices and common controls, and print reports. The only function protected by Level 3 authorization is the maintenance command, which allows the changing of pass codes and other maintenance operations. Except for this, Levels 2 and 3 are the same.

The color graphics terminal can support dozens of graphic displays to show everything from the layout of a main lobby to the building arrangement of a university campus. Typically, however, five kinds of graphic displays will be configured. These depict a cover screen, a building profile, a common control panel, a series of floor plans, and zone plans.

Figure 3:
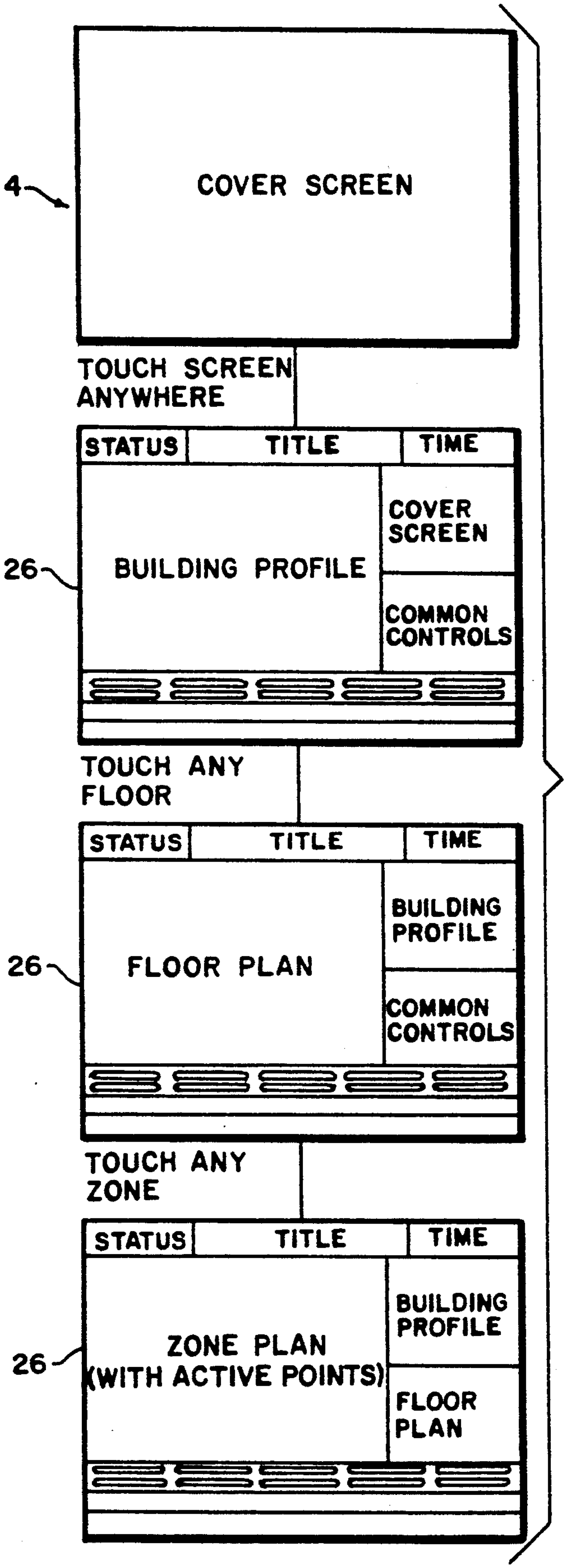
FIG. 3 is a schematic representation of a series of graphics windows which may appear on the graphics monitor screen during operation of the color graphics terminal of the present invention.

As shown in FIG. 3, a cover graphic display (cover screen) will fill the entire screen of monitor 4 if there are no alarms on the color graphics terminal and if more than one minute has elapsed without any activity. The cover screen is designed to minimize the amount of wear to the monitor 4. The cover screen will typically identify the color graphics terminal and show the message "TOUCH SCREEN TO ACTIVATE SYSTEM". Touching any part of the cover screen brings up the Working Screen with the Level 1 main menu displayed, and above it, in the main graphics window 26 the building profile. (See the first display in FIG. 3 below the cover screen).

The facility overview is the highest order of graphic display. Next is the building profile which shows the floor- by-floor arrangement of the site in profile. A touch-point is associated with each floor or level. Touching one of these touch-points when the building profile is in the main graphics window calls the plan for the selected floor to the main graphics window 26. (See the next lower display in FIG. 3).

Each floor plan will have one or more zone associated with it. These zones are graphically presented on the floor plan with the use of different colors. Touching the main graphics window within the borders of a zone plan when the floor plan is in the main graphics window will select it and move it into the main graphics window 26. (See the lowermost display in FIG. 3).

Zone plans in the main graphics window have one or more icons associated with them. These icons (FIG. 6), which typically represent devices, can be controlled (i.e., acknowledged, activated, deactivated, etc.) by selecting them in conjunction with the control menu.

The secondary graphics windows 28 and 30 display the same contents as the main graphics window 26, described above, though never at the same time. In addition to this, the secondary graphics windows display the information at about one quarter of the size, and the touch-points and icons, though visible are not active.

The contents of the two secondary graphics windows depends on what is displayed in the main graphics window. As a rule, plans showing wider views of what is in the main graphics window will be displayed in the secondary graphics windows. For example, if a zone plan is displayed in the main graphics window, then the corresponding building profile and floor plan will appear in the secondary graphics windows. (See lowermost display in FIG. 3).

Figure 6:
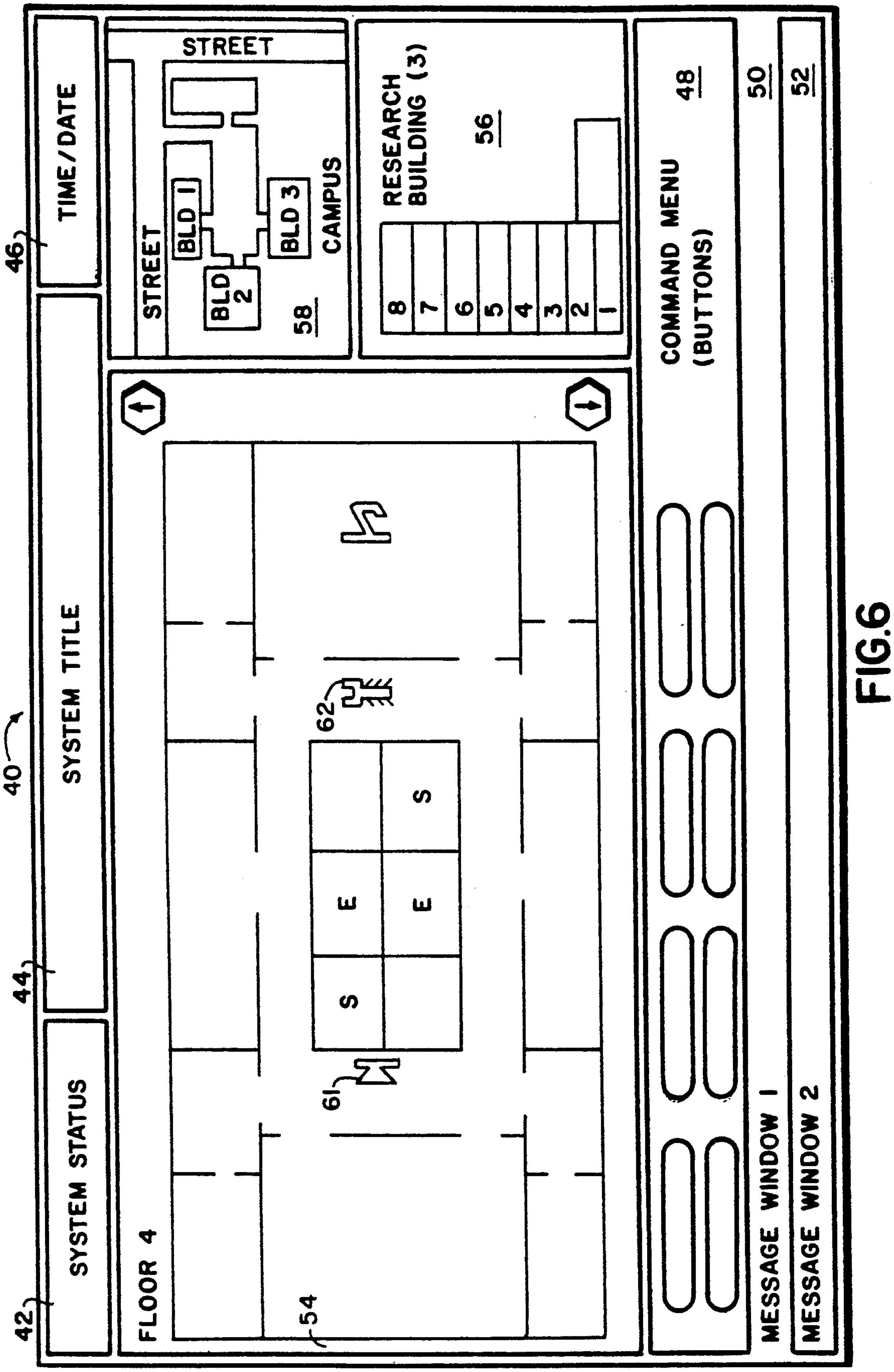
FIG. 6 is a schematic representation of the graphics windows of the graphics monitor wherein a floor plan is positioned within the main graphics window, a building profile is positioned within one secondary graphics window, and a facility overview is positioned within another secondary graphics window.

This is better exemplified in FIG. 6 wherein monitor 40 comprises: system status window 42, system title window 44, time/date window 46, command menu window 48, first message window 50, second message window 52, main graphics window 54, secondary graphics window 56, and secondary graphics window 58. Main graphics window 54 contains a graphic display of a floor plan, whereas secondary graphics window 56 contains a graphic display of the building profile and secondary graphics window 58 contains a graphic display of the campus or facility overview. Icons 60 and 62 are clearly displayed within the floor plan shown in main graphics window 54. Upon the selection of a particular zone plan from the floor plan displayed in main graphics window 54, the selected zone plan will be displayed in main graphics window 54, the floor plan graphic display will appear in secondary graphics window 58, and the building profile will remain in secondary graphics window 56.

Figure 4:
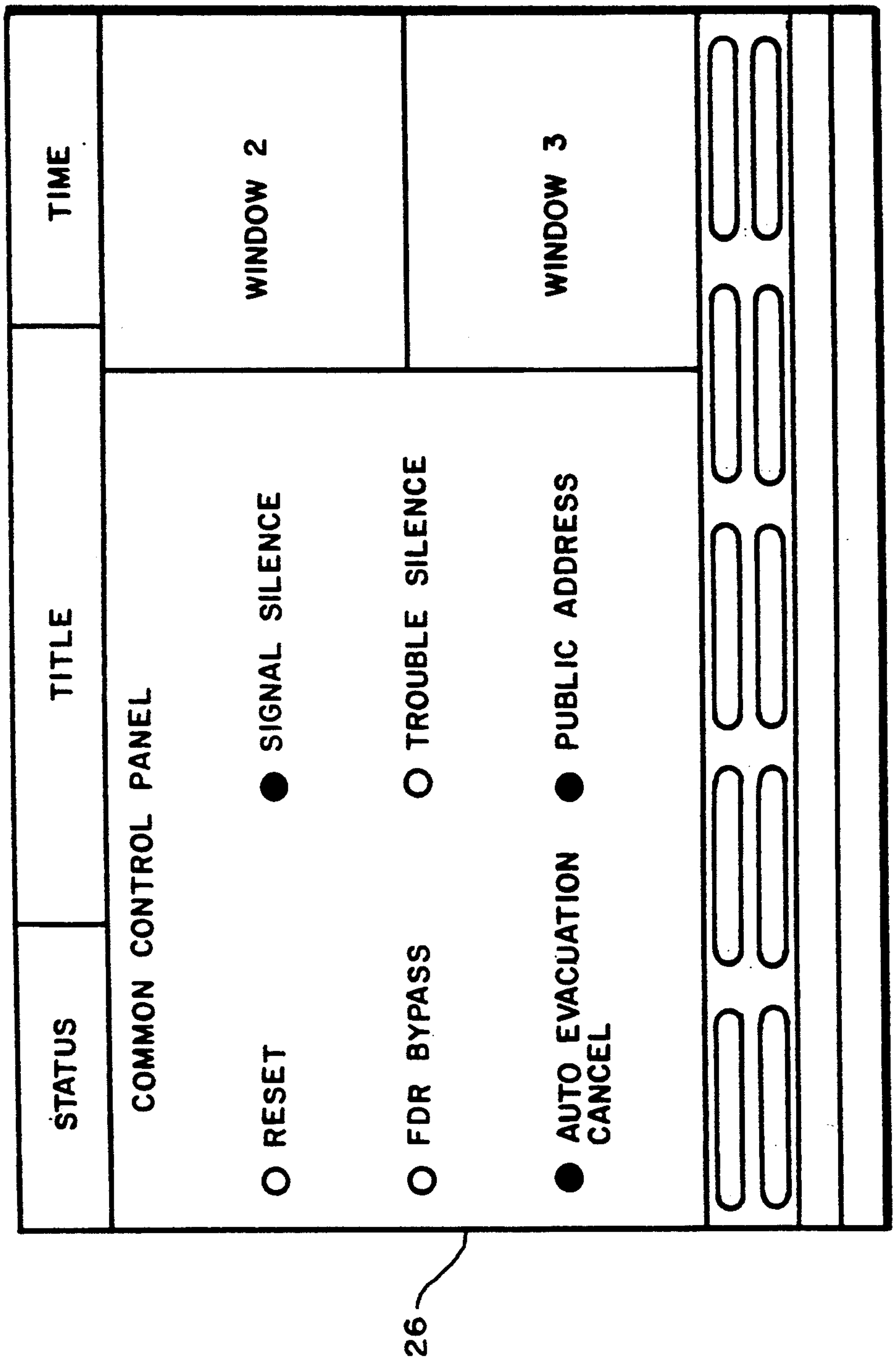
FIG. 4 is a schematic representation of the graphics windows of the graphics monitor wherein a common control panel is positioned within the main graphics window.

Each of the three maps (i.e., building profile, zone plan and floor plan) has an additional touch-point labeled CONTROL PANEL. Selecting this touch-point displays the terminal's common controls in the main graphics window 26. (See graphics display: Common Control Panel in FIG. 4). Each of these controls, which include RESET, SIGNAL SILENCE, TROUBLE SILENCE, AND TOTAL EVACUATION, is represented by a control button and an indicator (i.e., a corresponding area of contrasting color), which shows its current status.

These controls can be operated with the control feature, initiated by touching CONTROLS in the Level 2 and 3 main menus. While users at any authorization level may view the Common Control Panel, seen in FIG. 4, the CONTROLS button does not appear on the Level 1 main menu and consequently, operation of the common controls is restricted to the higher authorization levels. (See FIG. 5).

The color graphics terminal according to the present invention is particularly useful in the monitoring of system events, especially in alarm systems. Keeping tabs on system events such as troubles and alarms is the primary purpose of the color graphics terminal. The terminal organizes each event according to its type and the time it was logged. All events are sorted into one of four lists, called queues. They are called queues because events are stored within them in the order they were received. These queues are used to track alarms, troubles, supervisory devices, and monitors—one queue per event type. The four queues are also designated priorities relative to one another, with alarms being the highest and monitors being the lowest.

Figure 8A:
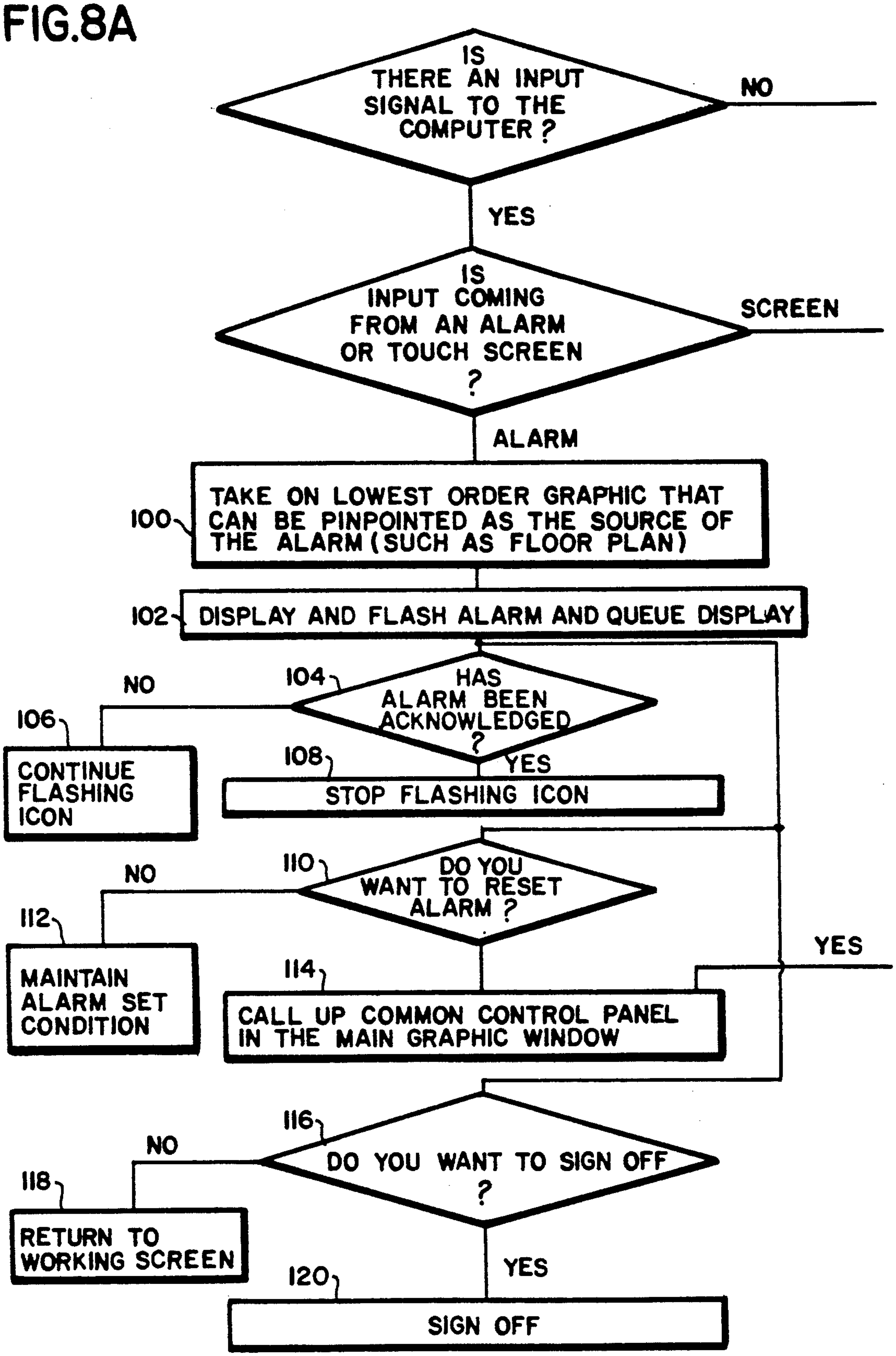
FIGS. 8A and 8B are related flow charts or diagrams depicting the logical steps or operations of the computer process to be performed, and pari passu, the means or apparatus for performing such steps or operations based on the programming being run on the computer to achieve the invention's objects.
Figure 8B:
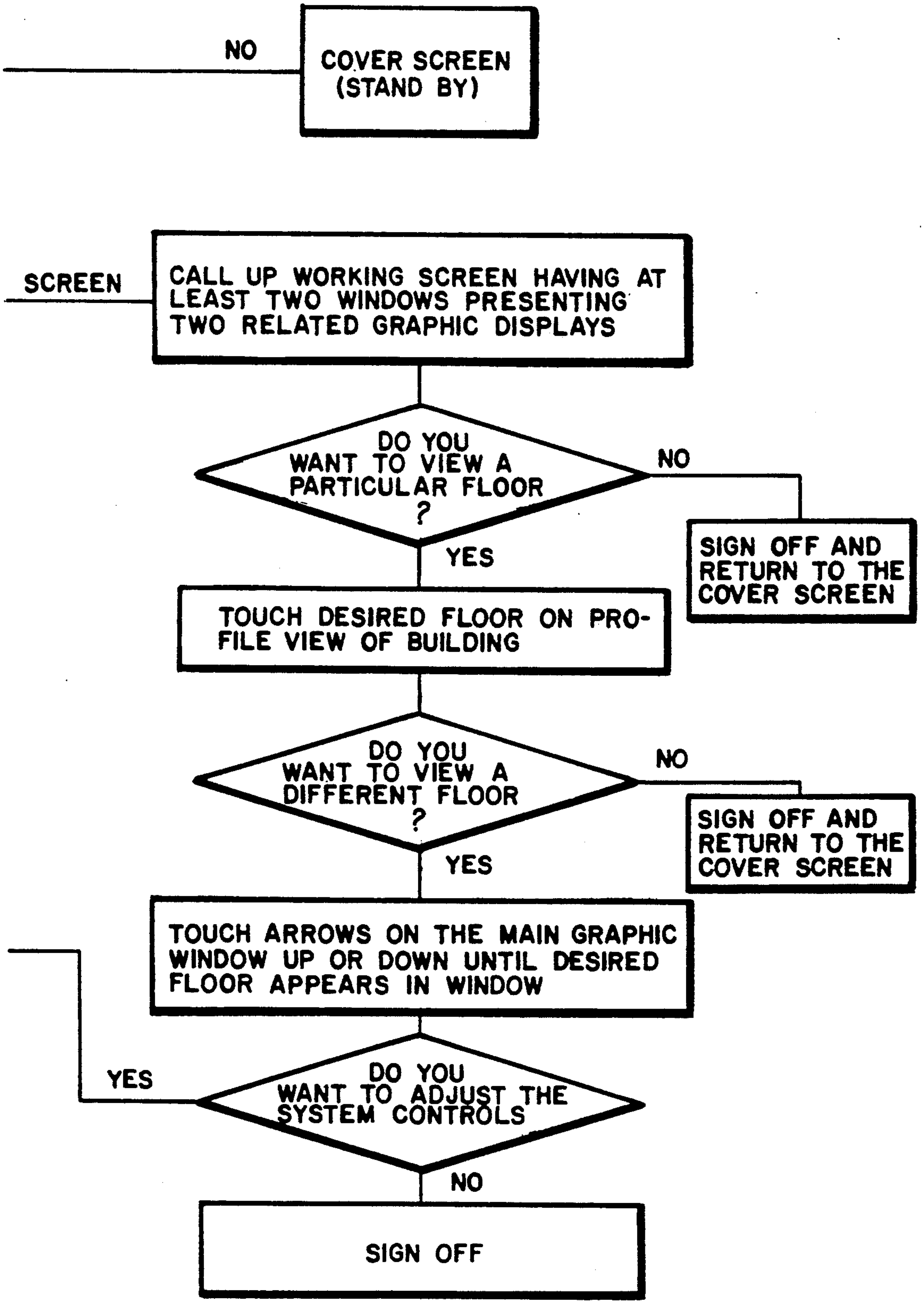

When an event occurs, say an alarm condition, several things happen. (See FIG. 8). First, the main graphics window takes on the lowest order graphic display (operation designated 100) that can be pinpointed as the source of the alarm condition. This means that if the system can narrow the alarm condition down to a particular device, a zone plan will be displayed with the device in question flashing. Similarly, if the alarm condition can only be traced to a zone, then the corresponding floor plan will be displayed with the zone in question flashing.

At the same time, the system status window at the top left corner of the graphics monitor displays the word ALARM on a red background (operation 102) and the Queue Display Menu appears below the graphics windows in the command menu window. This arrangement is displayed until an event of higher priority is received or until the operator interacts with the color graphics terminal. The automatic time-out function, which causes the cover screen to appear after a specified duration of inactivity, is suspended when an event has been logged.

The color graphics terminal automatically displays only the first event in the queue of highest priority. This means that if a second alarm comes in, or if a supervisory device or monitor is activated while the first alarm is being displayed, no outward change would occur. These subsequent events would, however, be entered into their respective queues for later viewing.

However, if a trouble condition was being indicated and then an alarm was received while the trouble was displayed, the main graphics window would change to show the source of that alarm and the status window would display ALARM on a red background. All subsequent events at this stage would be added to their respective queues and the graphics windows would remain as they are until the operator initiated some other activity.

All three main menus include a QUEUE DISPLAY button. Touching this brings forward a menu from which a specific queue can be chosen. Choosing a queue allows the operator to scroll among events that are stored in it. This is done by touching NEXT and PREVIOUS, as appropriate. Scrolling among events changes the contents of the main graphics window to the floor plan or zone plan where the event has taken place. Unacknowledged events are indicated by flashing device icons.

The acknowledge function is available to Level 2 and Level 3 authorized users only. The ACKNOWLEDGE control button appears on the main menus and on the QUEUE DISPLAY MENUS for the authorized levels. This makes it convenient to acknowledge events as you scroll through the queues.

An unacknowledged event is distinguished by a flashing icon that represents its device or origin (i.e., a smoke detector or manual station). To acknowledge the event, make sure the event in question is displayed in the main graphics window and touch the ACKNOWLEDGE button below. This will result in the message "Select point to be acknowledged" appearing in the message window. Touching a flashing icon at this point stops the flashing and the message "Point acknowledged" is displayed in the message window. The touch-point is acknowledged and the system is ready for you to acknowledge another one.

Acknowledging an event does not change its position in the queue. This means that the display order will remain the same. To remove an event from a queue, the color graphics terminal must be reset.

Individual devices or circuits can be enabled or disabled, allowing you to open dampers, start fans, charge sprinkler systems, etc., by touching icons that appear in the main graphics window. Also common controls such as signal silence and fire department relays can be activated or deactivated through the common control panel. (See FIG. 4).

Icons and touch-points are operated by making sure that the main graphics window contains the graphic display (i.e., floor plan or control panel) that carries the icon or touch-point you wish to control. The controls menu must then be called up.

With the icon or touch-point in the main graphics window and the controls menu below it, touch SWITCH ON or SWITCH OFF, as appropriate. This will cause all the switchable icons and touch-points in the main graphics window to be displayed encircled with a dotted box. In the message windows below the menu, the following will appear for a switch on command: "Switch on in progress." "Select point or function (icon in graphics window) to be activated."

Touching a highlighted icon or touch-point at this point will cause the following messages to appear: "Switch on point selected." "Touch PROCEED to confirm operation, or CANCEL to abort." Finally, touch PROCEED. This will activate the icon or turn on the switch you selected and ready the color graphics terminal to control another one.

While we have shown and described several embodiments in accordance with our invention, it is to be clearly understood that the same are susceptible to numerous changes apparent to one skilled in the art. Therefore, we do not wish to be limited to the details shown and described, but intend to show all changes and modifications which come within the scope of the appended claims.

What is claimed is:

1. A color graphics terminal for monitoring a fire alarm system in which a plurality of inputs become active depending on the occurrence of events taking place in the system comprising:

computer means;

a graphics monitor connected to said computer means, said graphics monitor having at least two separate graphics windows and capable of presenting simultaneously two geographically, hierarchically related graphic displays of said system;

means for controlling said computer means to automatically present on said graphics monitor said geographically, hierarchically related graphic displays in response to predetermined ones of said inputs becoming active responsive to events in the system received by said computer means;

wherein said inputs relate to said occurrence of events taking place within said system, whereby at least a peripheral perception of each of said events is dually enabled by the display in said at least two separate graphics windows; and means for interacting with the graphic displays, including means for moving the geographically, hierarchically related graphic displays from one graphic window to another, and for calling up other graphic displays of said system to any of said graphics windows.

2. The terminal as defined in claim 1, in which said two graphics windows are a main window and a secondary window.

3. The terminal according to claim 2, in which said means for interacting with the graphic displays is a touch screen.

4. The terminal according to claim 3, in which said touch screen is operative such that when a given area of said touch screen is touched the geographically, hierarchically related graphic displays will be affected.

5. The color graphics terminal according to claim 4, in which icons are included, and the touching of icons in said main graphics window enables system devices corresponding to the respective icons.

6. The color graphics terminal according to claim 5, wherein touching touch-points in said main graphics window will select floor plans.

7. The color graphics terminal according to claim 6, wherein touching any part of said secondary graphics window immediately moves the graphic displayed in said secondary graphics window into said main graphics window.

8. The color graphics terminal according to claim 7, wherein touching any part of a zone within a floor plan graphically displayed in said main graphics window immediately moves the respective zone into said main graphics window and the floor plan to said secondary graphics window.

9. The color graphics terminal according to claim 8, wherein the icons in the graphic displays are inoperable while the graphic displays are in said secondary graphics window.

10. The color graphics terminal according to claim 9, wherein said graphics monitor comprises three graphics windows.

11. The color graphics terminal according to claim 10, wherein the related graphic displays shown in said three graphics windows have the following ascending hierarchical relationship: zone plans, floor plans, building profile, facility overview.

12. The color graphics terminal according to claim 11, wherein said graphics monitor comprises a main graphics window and two secondary graphics windows.

13. The color graphics terminal according to claim 12, wherein said graphics monitor includes a command menu window.

14. The color graphics terminal according to claim 13, wherein said graphics monitor includes at least one message window.

15. The color graphics terminal according to claim 14, wherein said graphics monitor includes a system status window, a system title window and a time/date window.

* * * * *